US012618800B2

(12) United States Patent
Furuta et al.

(10) Patent No.: US 12,618,800 B2
(45) Date of Patent: May 5, 2026

(54) GAS SENSOR ELEMENT AND GAS SENSOR

(71) Applicant: NGK SPARK PLUG CO., LTD., Nagoya (JP)

(72) Inventors: Hitoshi Furuta, Nagoya (JP); Akinori Kojima, Nagoya (JP); Kentaro Kamada, Nagoya (JP); Yosuke Suzuki, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 487 days.

(21) Appl. No.: 18/085,067

(22) Filed: Dec. 20, 2022

(65) Prior Publication Data

US 2023/0204535 A1    Jun. 29, 2023

(30) Foreign Application Priority Data

Dec. 21, 2021    (JP) ................................. 2021-206698

(51) Int. Cl.
| | |
|---|---|
| *G01N 27/41* | (2006.01) |
| *G01N 27/407* | (2006.01) |
| *G01M 15/10* | (2006.01) |

(52) U.S. Cl.
CPC ......... *G01N 27/41* (2013.01); *G01N 27/4071* (2013.01); *G01M 15/102* (2013.01)

(58) Field of Classification Search
CPC ............... G01N 27/41; G01N 27/4071; G01N 27/4075; G01N 27/419; G01N 27/4072; G01N 27/4074; G01N 27/4077; G01M 15/102; Y02A 50/20
See application file for complete search history.

(56) References Cited

U.S. PATENT DOCUMENTS

| | | | | |
|---|---|---|---|---|
| 6,774,613 B1 * | 8/2004 | Becker | ............... | G01N 33/0011 |
| | | | | 324/71.5 |
| 2004/0069629 A1 * | 4/2004 | Tanaka | ................. | G01N 27/419 |
| | | | | 204/426 |
| 2016/0258897 A1 * | 9/2016 | Sakakibara | ............ | G01N 27/41 |
| 2019/0025248 A1 * | 1/2019 | Mizutani | .............. | G01N 27/419 |

FOREIGN PATENT DOCUMENTS

| | | | | | |
|---|---|---|---|---|---|
| JP | 2017207466 A | * | 11/2017 | ........... | G01N 27/407 |

* cited by examiner

*Primary Examiner* — Luan V Van
*Assistant Examiner* — Kaylee Tseng
(74) *Attorney, Agent, or Firm* — Sughrue Mion, PLLC

(57) ABSTRACT

A gas sensor element (10) which includes an element body portion (100); a pump cell (110) which is configured to adjust a concentration of oxygen in a gas to be measured which is introduced into the element body portion (100); a detection chamber (160) which is formed inside the element body portion (100) and into which the gas to be measured in which the concentration of oxygen has been adjusted is introduced; and a layer-shaped cathode electrode (133) which is housed in the detection chamber (160) and configured to decompose NO. A relationship between a volume V1 of the detection chamber (160) and a volume V2 of the cathode electrode (133) in the gas sensor element (10) satisfies either one of conditions (A) and (B) as defined herein.

4 Claims, 7 Drawing Sheets

GAS SENSOR ELEMENT AND GAS SENSOR

BACKGROUND OF THE INVENTION

1. Field of the Invention

The present disclosure relates to a gas sensor element and a gas sensor.

2. Description of the Related Art

A gas sensor that detects the concentration of $NO_x$ contained in exhaust gas of an internal combustion engine is known. Such a type of gas sensor utilizes the oxygen ion conductivity of zirconia ($ZrO_2$) heated to high temperatures, and in an equilibrium reaction of NO with $N_2$ and $O_2$. Further, while the decomposition of NO is accelerated by removing oxygen ($O_2$), oxygen generated by the decomposition is measured, whereby an $NO_x$ concentration is obtained.

As such a gas sensor, for example, a gas sensor that includes a gas sensor element including a first pump cell, a detection cell, a second pump cell, a first measurement chamber, a second measurement chamber, etc., is known (see, for example, Patent Document 1).

The first pump cell performs pumping-out and pumping-in (so called "pumping") of oxygen in exhaust gas between the first measurement chamber and the outside, and adjusts the concentration of oxygen in the exhaust gas. The concentration of oxygen in the first measurement chamber is controlled to a low level by the action of the first pump cell. The detection cell measures the concentration of oxygen in the exhaust gas on which pumping-out and pumping-in of oxygen has been performed by the first pump cell, and acts to apply a current (first pump current) to the first pump cell such that an output voltage (electromotive force) corresponding to the concentration of oxygen is constant.

The exhaust gas in the first measurement chamber in which the concentration of oxygen is controlled as described above is introduced into the second measurement chamber through a predetermined path in the gas sensor element. The second pump cell detects an $NO_x$ concentration from the exhaust gas introduced into the second measurement chamber. The second pump cell includes a pair of electrodes, and one electrode (cathode electrode, Ip2– electrode) of these electrodes is housed in the second measurement chamber. NO in the exhaust gas introduced into the second measurement chamber is decomposed into $N_2$ and $O_2$ at the electrode in the second measurement chamber. A second pump current for pumping out the oxygen generated by the decomposition to the other electrode (anode electrode) flows through the second pump cell. The second pump current is proportional to the NO concentration, so that the concentration of $NO_x$ (NO) in the exhaust gas is obtained by measuring the second pump current.

[Patent Document 1] Japanese Patent Application Laid-Open (kokai) No. 2017-207466

3. Problems to be Solved by the Disclosure

In a conventional gas sensor, improved responsiveness to NO is required by shortening the rise time of the output waveform of the second pump current described above.

SUMMARY OF THE DISCLOSURE

It is therefore an object of the present disclosure to provide a gas sensor element and a gas sensor having excellent NO responsiveness.

The means for solving the above problems are as follows.

<1> A gas sensor element including: an element body portion which includes a plurality of laminated ceramic sheets; a pump cell which is configured to adjust a concentration of oxygen in a gas to be measured which is introduced into the element body portion; a detection chamber which is formed inside the element body portion and into which the gas to be measured in which the concentration of oxygen has been adjusted is introduced; and a layer-shaped cathode electrode which is housed in the detection chamber and configured to decompose NO, wherein a relationship between a volume V1 of the detection chamber and a volume V2 of the cathode electrode satisfies either one of a condition (A) and a condition (B) described below, Condition (A): the volume V1 is not less than 0.047 mm³ and not greater than 0.065 mm³ and the volume V2 is not less than 0.030 mm³ and not greater than 0.059 mm³, and Condition (B): the volume V1 is not less than 0.047 mm³ and not greater than 0.125 mm³ and the volume V2 is not less than 0.044 mm³ and not greater than 0.059 mm³.

<2> The gas sensor element according to the above <1>, wherein the detection chamber penetrates at least one ceramic sheet among the plurality of ceramic sheets, in a thickness direction, and in a region where the detection chamber penetrates the ceramic sheet, a cross-sectional area of the detection chamber in a plane direction of the ceramic sheet is not less than 0.05 mm² and not greater than 0.35 mm².

<3> The gas sensor element according to the above <1> or <2>, further including: a solid electrolyte layer which forms a part of the element body portion and has a front surface on which the cathode electrode is formed; and an anode electrode which is disposed on the front surface of the solid electrolyte layer and configured to receive oxygen ions that are generated at the cathode electrode in accordance with decomposition of NO and move in the solid electrolyte layer.

<4> A gas sensor including the gas sensor element according to any one of the above <1> to <3>.

Effects of the Disclosure

According to the present disclosure, it is possible to provide a gas sensor element and a gas sensor having excellent NO responsiveness.

DESCRIPTION OF REFERENCE NUMERALS

Figure 1:
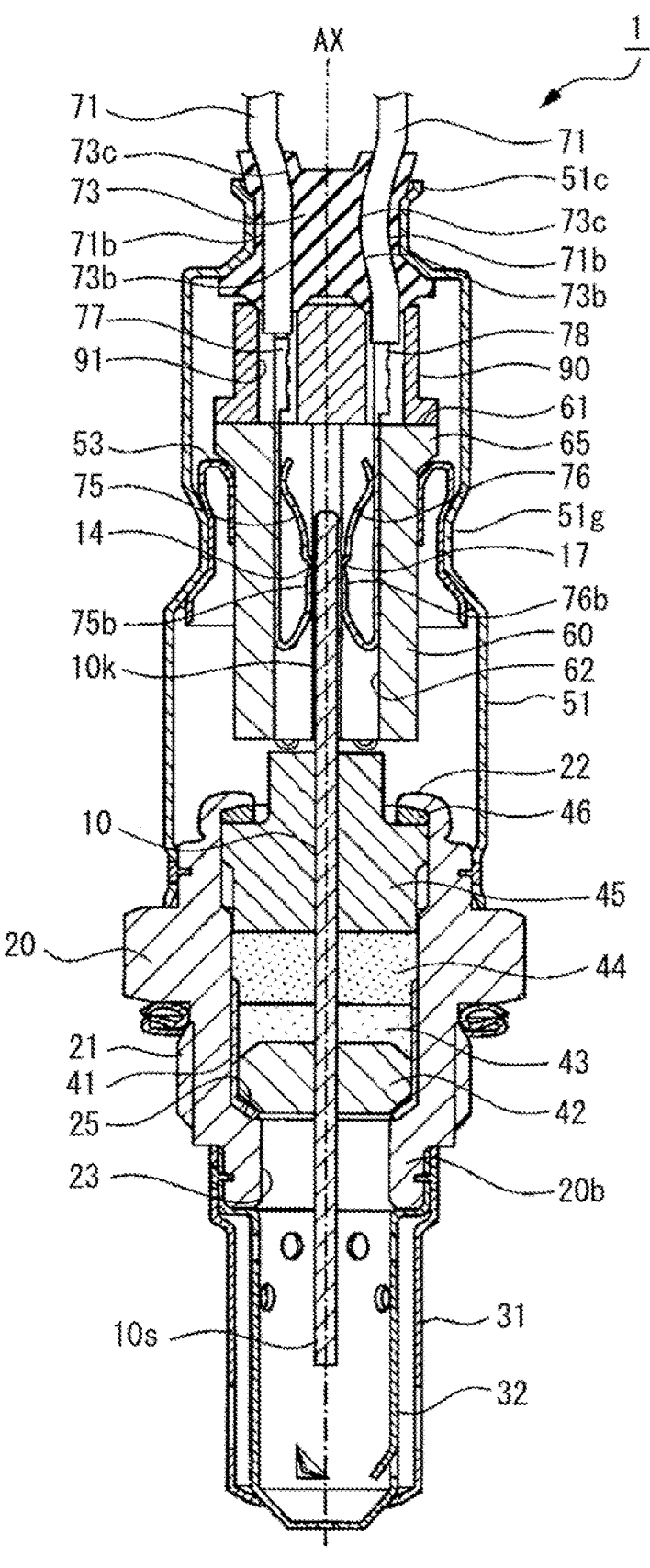
FIG. 1 is a longitudinal cross-sectional view of a gas sensor according to Embodiment 1.

Reference numerals used to identify various features in the drawings include the following.

1: gas sensor
10: gas sensor element
100: element body portion
110: IP1 cell (pump cell)
111s, 121s, 131s: insulating layer (ceramic sheet)
130: Ip2 cell
132: Ip2+ electrode (anode electrode)
133: Ip2− electrode (cathode electrode)
160: second measurement chamber (detection chamber)
161: introduction chamber
162: housing chamber
V1: volume of detection chamber
V2: volume of cathode electrode

DETAILED DESCRIPTION OF THE
PREFERRED EMBODIMENTS

The present disclosure is described in detail below with reference to the drawings. However, the present disclosure should not be construed as being limited thereto.

Embodiment 1

Figure 2:
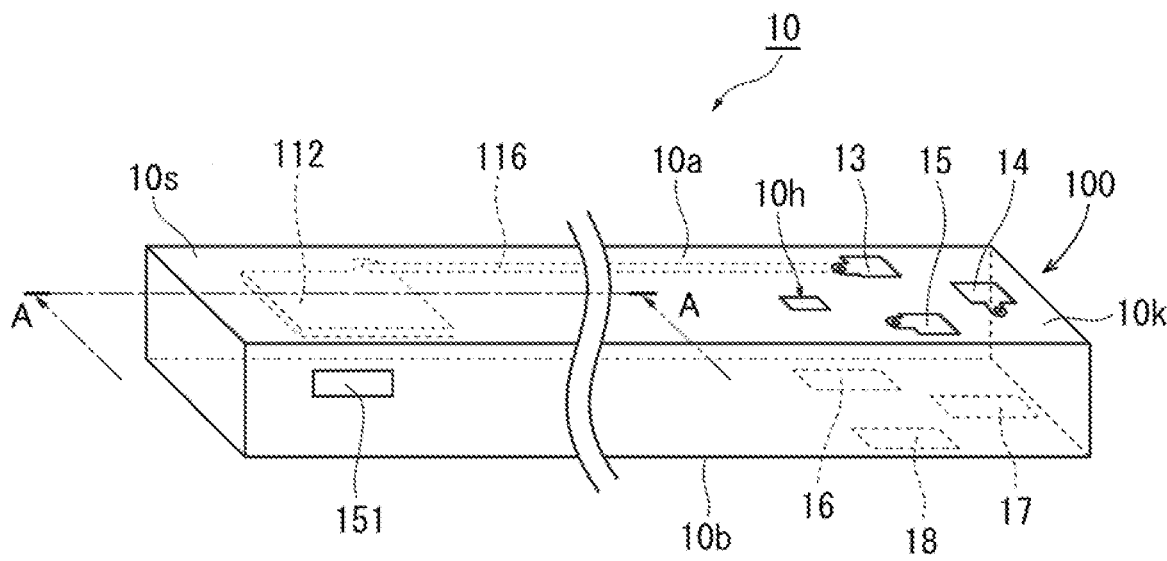
FIG. 2 is perspective view of a gas sensor element according to Embodiment 1.
Figure 3:
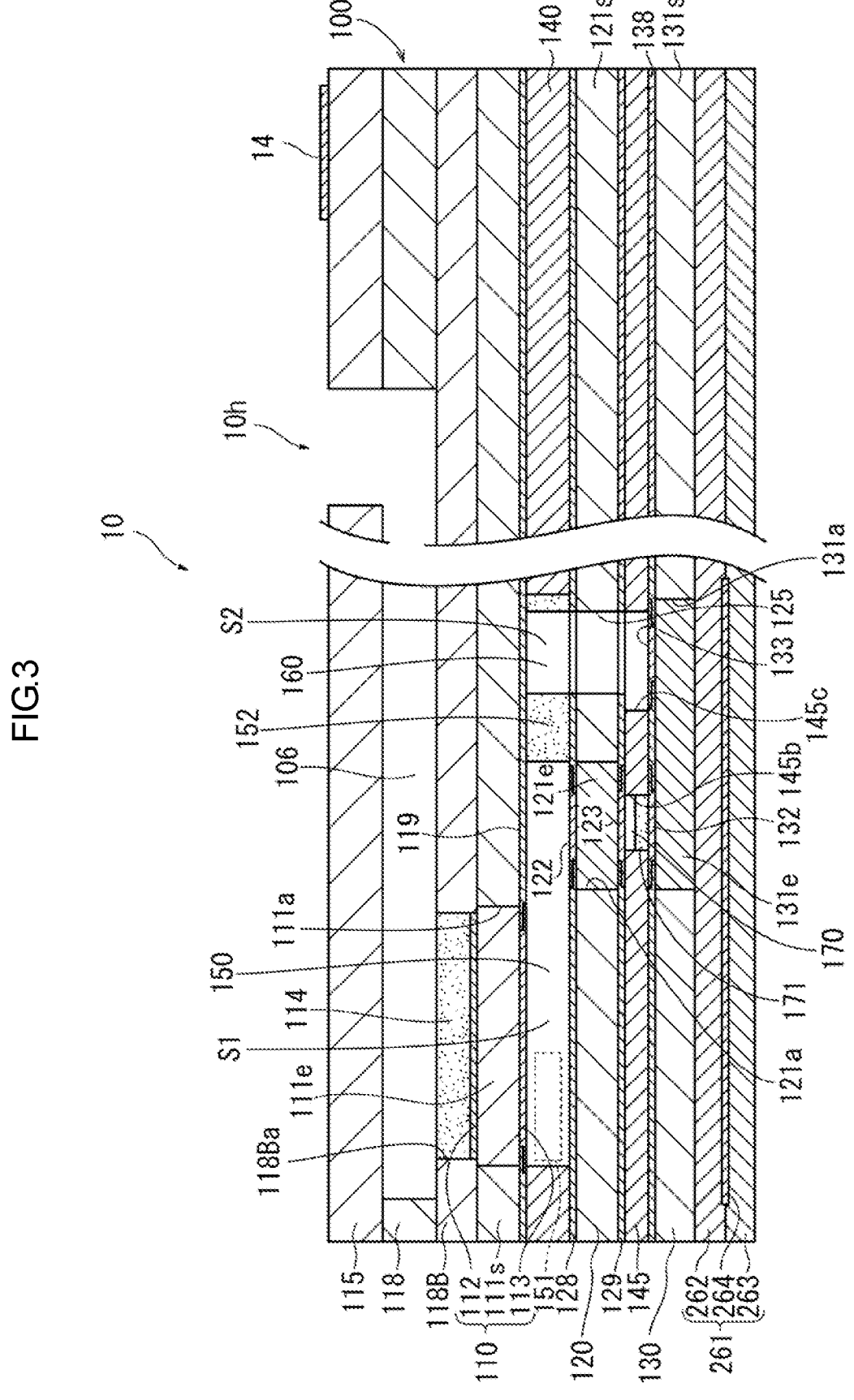
FIG. 3 is a cross-sectional view taken along a line A-A in FIG. 2.
Figure 4:
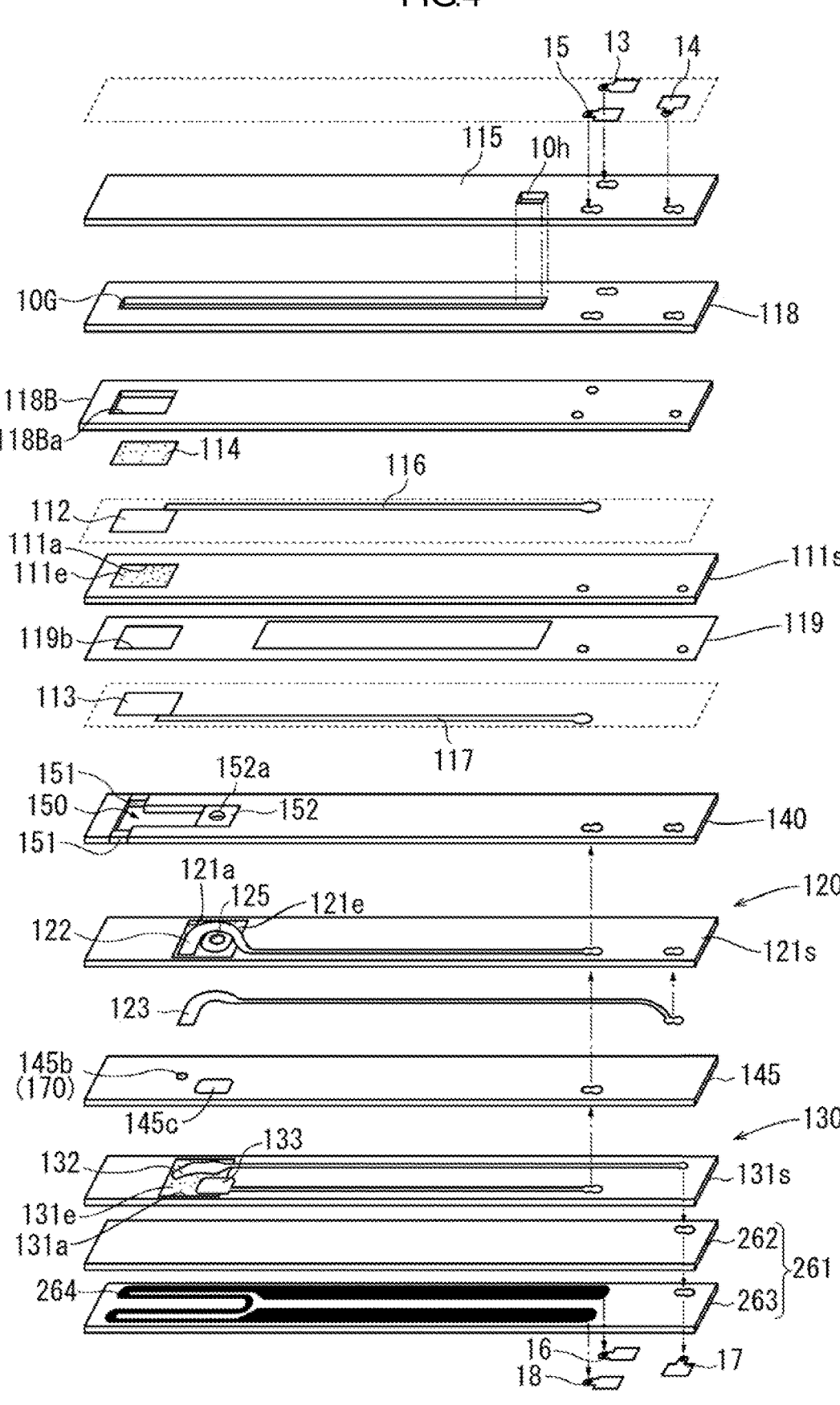
FIG. 4 is an exploded perspective view of the gas sensor element.

Hereinafter, Embodiment 1 of the present disclosure will be described with reference to FIG. 1 to FIG. 7. FIG. 1 is a longitudinal cross-sectional view of a gas sensor ($NO_x$ sensor) 1 according to Embodiment 1, FIG. 2 is a perspective view of a gas sensor element 10 according to Embodiment 1, FIG. 3 is a cross-sectional view taken along a line A-A in FIG. 2, and FIG. 4 is an exploded perspective view of the gas sensor element 10.

FIG. 1 shows an axial line AX of the gas sensor 1 as a straight line (alternate long and short dashed line) along the up-down direction. In the present specification, a direction along the axial line AX direction of the gas sensor 1 is also referred to as a "longitudinal direction", and a direction perpendicularly intersecting the axial line AX is also referred to as a "width direction". In addition, in the present specification, the lower side of the gas sensor 1 shown in FIG. 1 is referred to as a "front end side", and the side opposite thereto (upper side in FIG. 1) is referred to as a "rear end side". Moreover, for the convenience of description, the upper side in FIG. 2 to FIG. 5 is referred to as a "front side (front surface side)" of the gas sensor element 10, and the lower side in FIG. 2 to FIG. 5 is referred to as a "rear side (rear surface side)" of the gas sensor element 10.

The gas sensor 1 includes the gas sensor element 10 capable of detecting the concentration of $NO_x$ in exhaust gas which is a gas to be measured. The gas sensor 1 is an $NO_x$ sensor that is mounted and used on an exhaust pipe (not shown) of an internal combustion engine, and includes a tubular metal shell 20 having a threaded portion 21 adapted for fixing the gas sensor to the exhaust pipe and is formed at a predetermined position on the outer surface thereof. The gas sensor element 10 has an elongated plate shape extending along the axial line AX direction, as a whole, and such a gas sensor element 10 is held inside the metal shell 20.

The gas sensor 1 includes: a tubular holding member 60 having an insertion hole 62 into which a rear end portion 10k of the gas sensor element 10 is inserted; and six terminal members held inside the holding member 60. In FIG. 1, for the convenience of description, only two terminal members 75 and 76 of the six terminal members are shown.

In the rear end portion 10k of the gas sensor element 10, as shown in FIG. 2, a total of six electrode terminal portions 13 to 18 are formed so as to have a rectangular shape in a plan view. In FIG. 1, only the electrode terminal portions 14 and 17 are shown. The aforementioned terminal members are brought into elastic contact with and electrically connected to these electrode terminal portions 13 to 18, respectively. For example, an element contact portion 75b of the terminal member 75 is brought into elastic contact with and electrically connected to the electrode terminal portion 14, and an element contact portion 76b of the terminal member 76 is brought into elastic contact with and electrically connected to the electrode terminal portion 17.

Moreover, different lead wires 71 are electrically connected to the six terminal members (terminal members 75, 76, etc.), respectively. For example, as shown in FIG. 1, a core wire of a lead wire 71 is crimped and held by a lead wire holding portion 77 of the terminal member 75. In addition, a core wire of another lead wire 71 is crimped and held by a lead wire holding portion 78 of the terminal member 76.

As shown in FIG. 2, in one main surface 10a (on the front side) out of two main surfaces 10a and 10b of the rear end portion 10k of the gas sensor element 10, an opening-like atmospheric introduction port 10h is provided at a location on the front end side with respect to the electrode terminal portions 13 to 15 and on the rear end side with respect to a ceramic sleeve 45 (see FIG. 1) described below. The atmospheric introduction port 10h is located in the insertion hole 62 of the holding member 60.

The metal shell 20 is a tubular member having a through hole 23 which penetrates the metal shell 20 in the axial line AX direction. The metal shell 20 includes a shelf portion 25 which projects radially inward and forms a part of the through hole 23. The metal shell 20 holds the gas sensor element 10 inside the through hole 23 in a state where a front end portion 10s of the gas sensor element 10 projects out of the front end side of the metal shell 20 (downward in FIG. 1) and the rear end portion 10k of the gas sensor element 10 projects out of the rear end side of the metal shell 20 (upward in FIG. 1).

Moreover, inside the through hole 23 of the metal shell 20, an annular ceramic holder 42, two talc rings 43 and 44 formed by annularly filling with talc powder, and the ceramic sleeve 45 are disposed. More specifically, the ceramic holder 42, the talc rings 43 and 44, and the ceramic sleeve 45 are laminated in this order from the front end side to the rear end side of the metal shell 20 so as to surround the gas sensor element 10 which extends in the axial line AX.

A metal cup 41 is disposed between the ceramic holder 42 and the shelf portion 25 of the metal shell 20. In addition, a crimp ring 46 is disposed between the ceramic sleeve 45 and a crimp portion 22 of the metal shell 20. The crimp portion 22 of the metal shell 20 is crimped such that the ceramic sleeve 45 is pressed on the front end side via the crimp ring 46.

An outer protector 31 and an inner protector 32 each made of metal (for example, stainless steel) and having a plurality of holes are attached to a front end portion 20b of the metal shell 20 by welding so as to cover the front end portion 10s of the gas sensor element 10. In addition, an outer casing 51 is attached to a rear end portion of the metal shell 20 by welding. The outer casing 51 has a tubular shape extending in the axial line AX direction, as a whole, and surrounds the gas sensor element 10.

The holding member 60 is a tubular member made of an insulating material (for example, alumina) and having the insertion hole 62 which penetrates the member in the axial line AX direction. The above-described six terminal members (terminal members 75 and 76, etc.) are disposed inside the insertion hole 62 (see FIG. 1). A flange portion 65 is formed at a rear end portion of the holding member 60 so as to project radially outward. The holding member 60 is held by an inner support member 53 such that the flange portion 65 is in contact with the inner support member 53. The inner support member 53 is held by a crimp portion 51g, of the outer casing 51, which is crimped toward the radially inner side.

An insulating member 90 is disposed on a rear end surface 61 of the holding member 60. The insulating member 90 is made of an insulating material (for example, alumina), and has a tubular shape as a whole. In the insulating member 90, a total of six through holes 91 are formed so as to penetrate the insulating member 90 in the axial line AX direction. The lead wire holding portions 77, 78, etc., of the above-described terminal members are disposed in the through holes 91.

Moreover, in the outer casing 51, an elastic seal member 73 made of a fluororubber is disposed on the radially inner side of a rear end opening 51c located on the rear end side. In the elastic seal member 73, a total of six cylindrical insertion holes 73c are formed so as to extend in the axial line AX direction. Each insertion hole 73c is formed by an insertion hole surface 73b (cylindrical inner wall surface) of the elastic seal member 73. One lead wire 71 is inserted into each insertion hole 73c. Each lead wire 71 extends outside the gas sensor 1 through the insertion hole 73c of the elastic seal member 73. The elastic seal member 73 is elastically compressed and deformed in the radial direction by radially inwardly crimping the rear end opening 51c of the outer casing 51, whereby the insertion hole surface 73b and an outer circumferential surface 71b of the lead wire 71 are brought into close contact with each other to be sealed in a watertight manner.

As shown in FIG. 3, the gas sensor element 10 includes an element body portion 100 which has a plurality of plate-shaped insulating layers (ceramic sheets) 111s, 121s, and 131s, solid electrolyte bodies 111e, 121e, and 131e formed in the plate-shaped insulating layers 111s, 121s, and 131s, and insulators 140 and 145 disposed between the plate-shaped insulating layers 111s, 121s, and 131s. Each of the insulators 140 and 145 is made of a dense ceramic (for example, alumina). The gas sensor element 10 further includes a heater 261 disposed on the rear surface side of the solid electrolyte body 131e. The heater 261 includes two plate-shaped insulators 262 and 263 mainly made of alumina, and a heater pattern 264 embedded between the insulators 262 and 263. The heater pattern 264 is composed of a film-shaped pattern mainly made of platinum (Pt).

Each of the solid electrolyte bodies 111e, 121e, and 131e has a substantially rectangular shape in a plan view. The solid electrolyte body 111e is formed so as to overlap an opening 111a provided on the front end side (left side in FIG. 4) in the plate-shaped insulating layer 111s which extends in the axial line AX direction. The solid electrolyte body 121e is formed so as to overlap an opening 121a provided on the front end side (left side in FIG. 4) in the plate-shaped insulating layer 121s which extends in the axial line AX direction. The solid electrolyte body 131e is formed so as to overlap an opening 131a provided on the front end side (left side in FIG. 4) in the plate-shaped insulating layer 131s which extends in the axial line AX direction. The solid electrolyte bodies 111e, 121e, and 131e may be formed so as to be embedded in the corresponding openings 111a, 121a, and 131a, respectively, or may be formed by transferring separately prepared sheet-shaped members to predetermined locations.

The insulators 140 and 145 are each composed of a fired printed layer having a smaller thickness than the insulating layer (ceramic sheet) 121s, etc.

The solid electrolyte bodies (solid electrolyte layers) 111e, 121e, and 131e are made of zirconia which is a solid electrolyte, and have oxygen ion conductivity. A porous Ip1+ electrode 112 is provided on the front surface side of the solid electrolyte body 111e. In addition, a porous Ip1− electrode 113 is provided on the rear surface side of the solid electrolyte body 111e. Furthermore, the front surface of the Ip1+ electrode 112 is covered with a porous layer 114. An Ip1+ lead 116 is connected to the Ip1+ electrode 112 (see FIG. 2 and FIG. 4). In addition, an Ip1− lead 117 (see FIG. 4) is connected to the Ip1− electrode 113.

As shown in FIG. 4, a plate-shaped dense layer 118B extending in the axial line AX direction is laminated on the respective front surfaces of the Ip1+ electrode 112 and the Ip1+ lead 116. The dense layer 118B is made of a gas-impermeable material such as alumina. An opening 118Ba having a rectangular shape in a plan view is provided on the front end side of the dense layer 118B. The above-described porous layer 114 is formed so as to fill the opening 118Ba.

As shown in FIG. 4, a gas-impermeable dense layer 118 including a void 10G and made of alumina or the like is disposed on the front surface side of the dense layer 118B. A part of the porous layer 114 is exposed from the void 10G. In the plate-shaped dense layer 118 which extends in the axial line AX direction, the void 10G extends straight from a portion near the porous layer 114 to a portion connected to the atmospheric introduction port 10h. In the plate-shaped dense layer 118 which extends in the axial line AX direction, through holes for electrical conduction with the electrode terminal portions 13, 14, and 15 are provided on the rear end side.

A gas-impermeable dense layer 115 made of alumina or the like is laminated on the front surface of the dense layer 118. When the dense layer 115 is laminated as described above, the void 10G is closed by the dense layer 115.

In the dense layer 115, the atmospheric introduction port 10h is formed at a position overlapping the rear end of the void 10G which extends in the longitudinal direction (axial line AX direction). The atmospheric introduction port 10h is composed of an opening penetrating the dense layer 115 in the thickness direction. Such an atmospheric introduction port 10h is connected to the void 10G. The atmospheric introduction port 10h is open on the rear end side with respect to first porous bodies 151 described below, and, rather than exhaust gas, atmospheric air can be introduced therethrough. Accordingly, the Ip1+ electrode 112 is exposed to the atmospheric air introduced from the atmospheric introduction port 10h via the porous layer 114.

The solid electrolyte body 111e, the Ip1+ electrode 112, and the Ip1− electrode 113 form an Ip1 cell (first pump cell; an example of the pump cell of the present disclosure) 110. According to a pump current Ip1 (first pump current) applied between the Ip1+ electrode 112 and the Ip1− electrode 113, the Ip1 cell 110 performs pumping-out and pumping-in of oxygen (so called "oxygen pumping") between the atmosphere (atmospheric air in the void 10G) with which the Ip1+ electrode 112 contacts and the atmosphere (atmosphere in a first measurement chamber 150 described below, that is, a gas to be measured which is outside the gas sensor element 10) with which the Ip1− electrode 113 contacts. As described above, the Ip1 cell 110 adjusts the concentration of oxygen in the gas to be measured (exhaust gas) introduced into the element body portion 100.

A porous Vs− electrode 122 is provided on the front surface side of the solid electrolyte body 121e. In addition, a porous Vs+ electrode 123 is provided on the rear surface side of the solid electrolyte body 121e.

The first measurement chamber 150 is formed between the solid electrolyte body 111e and the solid electrolyte body 121e in the lamination direction. The first measurement chamber 150 is composed of an inner space S1, in the gas sensor element 10, into which a gas to be measured (exhaust gas) flowing in an exhaust passage in the exhaust pipe is first introduced, and communicates with the outside of the gas sensor element 10 through gas-permeable and water-permeable first porous bodies (diffusion resistance portions) 151 (see FIG. 2 and FIG. 4). Each first porous body 151 is provided on the lateral side of the first measurement chamber 150 as a partition to the outside of the gas sensor element 10. Such first porous bodies 151 limit the flowing amount per unit time (diffusion rate) of the exhaust gas into the first measurement chamber 150. The first porous bodies 151 are made of a porous ceramic.

A second porous body 152 which limits the flowing amount per unit time of the exhaust gas is provided on the rear end side of the first measurement chamber 150 (right side in FIG. 3) as a partition between the first measurement chamber 150 and a second measurement chamber 160 described below.

The solid electrolyte body 121e, the Vs− electrode 122, and the Vs+ electrode 123 form a Vs cell (detection cell) 120. The Vs cell 120 generates an electromotive force mainly according to the difference in oxygen partial pressure between the atmospheres separated by the solid electrolyte body 121e (the atmosphere in the first measurement chamber 150 with which the Vs− electrode 122 contacts and the atmosphere in a reference oxygen chamber 170 with which the Vs+ electrode 123 contacts).

A porous Ip2+ electrode (anode electrode) 132 and a porous Ip2− electrode (cathode electrode) 133 are provided on the front surface side of the solid electrolyte body 131e.

The reference oxygen chamber 170 is formed as an isolated small space between the Ip2+ electrode 132 and the Vs+ electrode 123. The reference oxygen chamber 170 is formed by an opening 145b formed in the insulator 145. In the reference oxygen chamber 170, a porous body 171 made of ceramic is disposed on the Ip2+ electrode 132 side (see FIG. 3).

Moreover, the second measurement chamber 160 composed of an inner space S2 is formed at a position opposed to the Ip2− electrode (cathode electrode) 133 in the lamination direction. The second measurement chamber 160, etc., will be described in detail below.

The first measurement chamber 150 and the second measurement chamber 160 communicate with each other via the gas-permeable and water-permeable second porous body 152. Therefore, the second measurement chamber 160 communicates with the outside of the gas sensor element 10 through the first porous bodies 151, the first measurement chamber 150, and the second porous body 152.

The solid electrolyte body 131e, the Ip2+ electrode 132, and the Ip2− electrode 133 form an Ip2 cell 130 (second pump cell) for detecting an $NO_x$ concentration. The Ip2 cell 130 moves oxygen (oxygen ions) derived from $NO_x$ decomposed in the second measurement chamber 160, to the reference oxygen chamber 170 through the solid electrolyte body 131e. At that time, a current (second pump current) corresponding to the concentration of $NO_x$ contained in the exhaust gas (gas to be measured) introduced into the second measurement chamber 160 flows between the Ip2+ electrode 132 and the Ip2− electrode 133.

In the present embodiment, an alumina insulating layer 119 is formed on a portion, other than the Ip1− electrode 113, of the rear surface of the insulating layer 111s. The Ip1− electrode 113 is in contact with the solid electrolyte body 111e through a through hole 119b (see FIG. 4) which penetrates the alumina insulating layer 119 in the lamination direction. In addition, an alumina insulating layer 128 is formed on a portion, other than the Vs− electrode 122, of the front surface of the insulating layer 121s. In FIG. 4, for the convenience of description, the alumina insulating layer 128 is not shown. The Vs− electrode 122 is in contact with the solid electrolyte body 121e through a through hole (not shown) which penetrates the alumina insulating layer 128 in the lamination direction.

Moreover, an alumina insulating layer 129 (see FIG. 3) is formed on a portion, other than the Vs+ electrode 123, of the rear surface of the insulating layer 121s. In FIG. 4, for the convenience of description, the alumina insulating layer 129 is not shown. The Vs+ electrode 123 is in contact with the solid electrolyte body 121e through a through hole (not shown) which penetrates the alumina insulating layer 129 in the lamination direction.

Moreover, an alumina insulating layer 138 (see FIG. 3) is formed on a portion, other than the Ip2+ electrode 132, the Ip2− electrode 133, etc., of the front surface of the insulating layer 131s. In FIG. 4, for the convenience of description, the alumina insulating layer 138 is not shown. The Ip2+ electrode 132 and the Ip2− electrode 133 are in contact with the solid electrolyte body 131e through a through hole (not shown) which penetrates the alumina insulating layer 138 in the lamination direction.

Here, a method for detecting an $NO_x$ concentration by the gas sensor 1 of the present embodiment will be briefly described. The solid electrolyte bodies 111e, 121e, and 131e of the gas sensor element 10 are heated and activated as the temperature of the heater pattern 264 is increased. Accordingly, the Ip1 cell 110, the Vs cell 120, and the Ip2 cell 130 operate individually.

The exhaust gas flowing through the exhaust passage (not shown) in the exhaust pipe is introduced into the first measurement chamber 150 while the flowing amount thereof is limited by each first porous body 151. At this time, a weak current (micro current) Icp is applied to the Vs cell 120 so as to flow from the Vs+ electrode 123 side to the Vs− electrode 122 side. Consequently, oxygen in the exhaust gas can receive electrons from the Vs− electrode 122 in the first measurement chamber 150, which is the negative electrode side, flows in the solid electrolyte body 121e as oxygen ions, and moves into the reference oxygen chamber 170. That is, by applying the current Icp between the Vs− electrode 122 and the Vs+ electrode 123, the oxygen in the first measurement chamber 150 is transported into the reference oxygen chamber 170.

If the oxygen concentration of the exhaust gas introduced into the first measurement chamber 150 is lower than a predetermined value, a current Ip1 is applied to the Ip1 cell 110 such that the Ip1+ electrode 112 side becomes a negative electrode, and oxygen is pumped from the outside of the gas sensor element 10 into the first measurement chamber 150. On the other hand, if the oxygen concentration of the exhaust gas introduced into the first measurement chamber 150 is higher than the predetermined value, the current Ip1 is applied to the Ip1 cell 110 such that the Ip1− electrode 113 side becomes a negative electrode, and oxygen is pumped from the inside of the first measurement chamber 150 to the outside of the gas sensor element 10.

The exhaust gas whose oxygen concentration has been adjusted in the first measurement chamber 150 as described above is introduced into the second measurement chamber 160 through the second porous body 152. $NO_x$ in the exhaust gas which contacts the Ip2– electrode (cathode electrode) 133 in the second measurement chamber 160 is decomposed (reduced) to nitrogen and oxygen on the Ip2– electrode 133 by a voltage Vp2 being applied between the Ip2+ electrode 132 and the Ip2– electrode 133, and oxygen resulting from the decomposition flows in the solid electrolyte body 131e as oxygen ions and moves into the reference oxygen chamber 170. At this time, the residual oxygen remaining in the first measurement chamber 150 without having been pumped out is similarly moved into the reference oxygen chamber 170 by the Ip2 cell 130. Accordingly, a current based on $NO_x$ and a current based on the residual oxygen flow through the Ip2 cell 130. The oxygen that has moved into the reference oxygen chamber 170 is released to the outside (atmospheric air) via the Vs+ electrode 123 and a Vs+ lead and the Ip2+ electrode 132 and an Ip2+ lead, which are in contact with the inside of the reference oxygen chamber 170. For this reason, the Vs+ lead and the Ip2+ lead are porous.

Since the concentration of residual oxygen remains in the first measurement chamber 150 without having been pumped out is adjusted to the predetermined value described above, the current based on the residual oxygen can be considered to be substantially constant. That is, the current based on the residual oxygen has little effect on the variation of the current based on $NO_x$, and the current (second pump current) flowing through the Ip2 cell 130 is proportional to the $NO_x$ concentration. Therefore, a current Ip2 (second pump current) flowing through the Ip2 cell 130 is measured, and the $NO_x$ concentration of the exhaust gas is detected based on the current value thereof.

Figure 5:
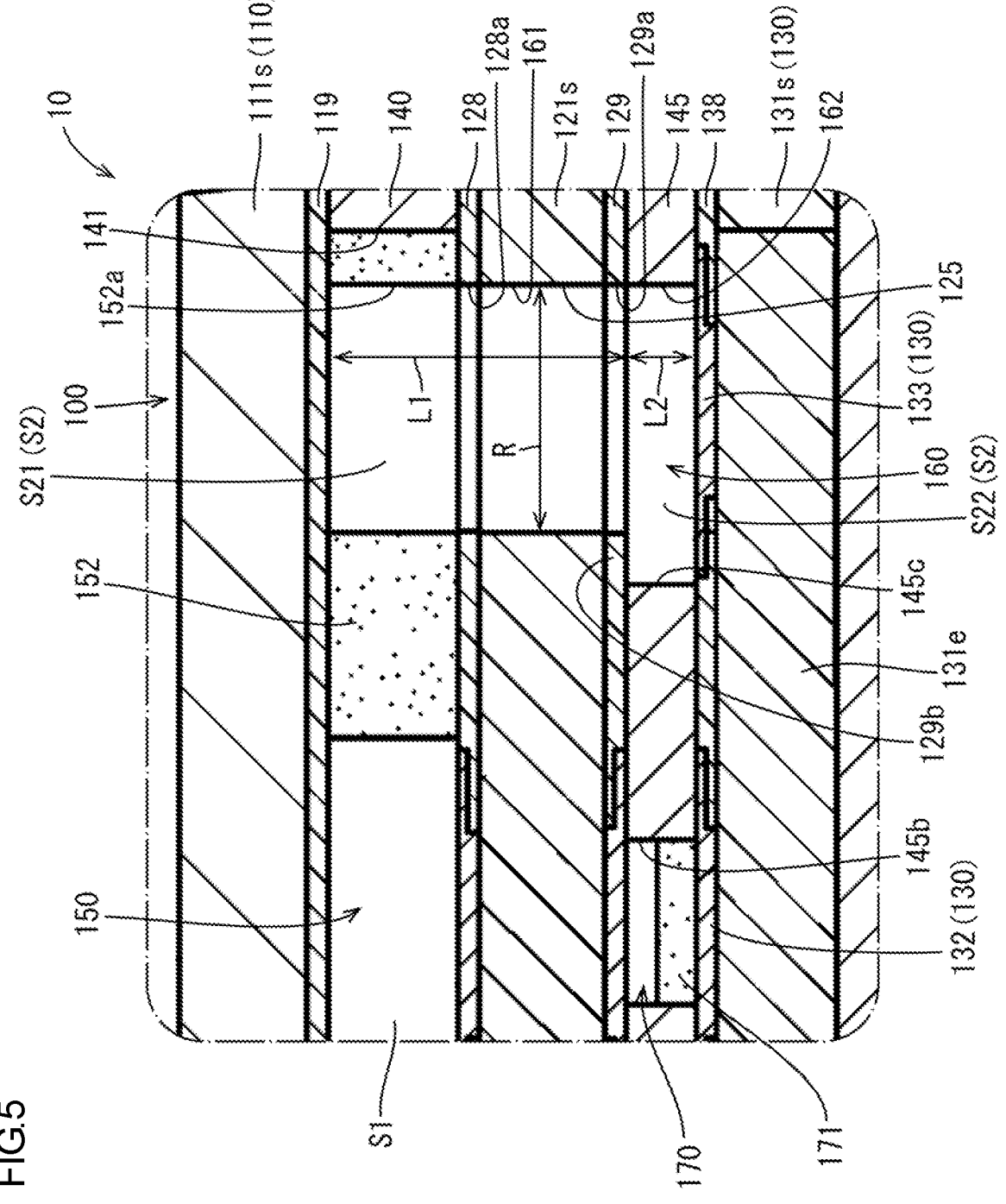
FIG. 5 is an enlarged cross-sectional view of the gas sensor element around a second measurement chamber.

Next, the second measurement chamber 160 which is formed inside the gas sensor element 10 will be described with reference to FIG. 5. FIG. 5 is an enlarged cross-sectional view of the gas sensor element 10 in the vicinity of the second measurement chamber 160. For the convenience of description, the upper side in FIG. 5 is referred to as an "upper side (upper end side)" of the second measurement chamber 160, and the lower side in FIG. 5 is referred to as a "lower side (lower end side)" of the second measurement chamber 160.

The second measurement chamber (an example of the detection chamber of the present disclosure) 160 forms the inner space S2 for detecting $NO_x$ contained in the exhaust gas which is a gas to be measured. The second measurement chamber 160 includes a cylindrical introduction chamber 161 which extends in the lamination direction (thickness direction) of the gas sensor element 10 (element body portion) and is closed at one end (upper end) thereof, and a housing chamber 162 which is connected to the other end (lower end) of the introduction chamber 161 and in which the Ip2– electrode (cathode electrode) 133 is housed (see FIG. 5).

The introduction chamber 161 is a portion into which the exhaust gas having passed through the second porous body 152 is introduced, and is formed in a cylindrical shape with one end (upper end) closed as described above. The upper end side of the introduction chamber 161 is composed of a cylindrical first peripheral wall portion 152a which surrounds a hole penetrating the second porous body 152 in the thickness direction. The exhaust gas having passed through the second porous body 152 is discharged from the first peripheral wall portion 152a and introduced into the introduction chamber 161. The second porous body 152 is fitted to the rear end side of an opening 141 provided in the insulator 140 (the rear end side of the gas sensor element 10). Such a second porous body 152 separates the inner space S1 of the first measurement chamber 150 and the inner space S2 of the second measurement chamber 160 from each other in a state where it is possible to provide communication therebetween.

The height of the first peripheral wall portion 152a (thickness of the second porous body 152) is, for example, about 30 µm. As shown in FIG. 5, the upper end of the first peripheral wall portion 152a is closed by being covered with the alumina insulating layer 119 which is disposed between the second porous body 152 and the insulating layer 111s. The first peripheral wall portion 152a is produced, for example, by printing a material for forming the second porous body 152, on the insulating layer 121s, then drying the printed layer thus obtained, forming a hole in the dried printed layer by punching or the like, and firing the printed layer.

On the lower end side of the first peripheral wall portion 152a in the introduction chamber 161, a cylindrical second peripheral wall portion 128a which surrounds a hole penetrating the alumina insulating layer 128 in the thickness direction, a cylindrical third peripheral wall portion 125 which surrounds a hole penetrating the insulating layer 121s in the thickness direction, and a cylindrical fourth peripheral wall portion 129a which surrounds a hole penetrating the alumina insulating layer 129 in the thickness direction, are disposed in this order.

The second peripheral wall portion 128a is formed in the alumina insulating layer 128 which is disposed between the insulator 140 (second porous body 152) and the insulating layer 121s. The second peripheral wall portion 128a is obtained by: providing in advance a hole in a printed layer for forming the alumina insulating layer 128, by punching with a press pin or the like such that the hole penetrates the printed layer in the thickness direction; and firing the printed layer. The length in the up-down direction (height) of the second peripheral wall portion 128a is, for example, about 15 µm.

The third peripheral wall portion 125 is formed in the insulating layer 121s which is used for the Vs cell (detection cell) 120. The third peripheral wall portion 125 is obtained by: providing in advance a hole in a ceramic green sheet for forming the insulating layer 121s, by punching with a press pin or the like such that the hole penetrates the ceramic green sheet in the thickness direction; and firing the ceramic green sheet (for example, thickness: 200 µm). The third peripheral wall portion 125 has the largest length in the up-down direction (height) among the portions forming the introduction chamber 161, and occupies a large portion of the introduction chamber 161 (for example, 70 to 80% of the height thereof). FIG. 5 shows a length L1 in the up-down direction (for example, about 220 µm) of the introduction chamber 161.

The fourth peripheral wall portion 129a is formed in the alumina insulating layer 129 which is disposed between the insulating layer 121s and the insulator 145. The fourth peripheral wall portion 129a is obtained by: providing in advance a hole in a printed layer for forming the alumina insulating layer 129, by punching with a press pin or the like such that the hole penetrates the printed layer in the thickness direction; and firing the printed layer.

As described above, the introduction chamber 161 is formed by the first peripheral wall portion 152a, the alumina insulating layer 119 which is a portion closing the upper end of the first peripheral wall portion 152a, the second peripheral wall portion 128a, the third peripheral wall portion 125, and the fourth peripheral wall portion 129a. Of the inner space S2 of the second measurement chamber 160, a space formed by the introduction chamber 161 is referred to as an inner space S21.

The introduction chamber 161 of the second measurement chamber (detection chamber) 160 is provided so as to penetrate, in the thickness direction, at least the one ceramic sheet (insulating layer) 121s among the plurality of ceramic sheets (insulating layers) 111s, 121s, and 131s, etc., which form the element body portion 100. In a region, of the second measurement chamber 160, which penetrates the ceramic sheet (insulating layer) 121s (that is, the third peripheral wall portion 125), the cross-sectional area of the second measurement chamber 160 (introduction chamber 161) in a plane direction of the ceramic sheet (insulating layer) 121s (direction perpendicular to the thickness direction) is preferably not less than 0.05 mm$^2$ and not greater than 0.35 mm$^2$, and more preferably not less than 0.05 mm$^2$ and not greater than 0.09 mm$^2$. When the cross-sectional area of the second measurement chamber 160 (introduction chamber 161) is within such a range, a condition (A) and a condition (B) described later are easily satisfied.

The housing chamber 162 is a portion which is connected to the introduction chamber 161 and in which the Ip2− electrode (cathode electrode) 133 forming the Ip2 cell (second pump cell) 130 is housed. As shown in FIG. 5, the housing chamber 162 is connected to the lower end of the introduction chamber 161, and forms the second measurement chamber 160 together with the introduction chamber 161. Of the inner space S2 of the second measurement chamber 160, a space formed by the housing chamber 162 is referred to as an inner space S22. The inner space S22 of the housing chamber 162 and the inner space S21 of the introduction chamber 161 are connected to each other, and the exhaust gas introduced into the introduction chamber 161 can move into the housing chamber 162.

The housing chamber 162 is formed by a frame-shaped fifth peripheral wall portion 145c which surrounds a hole penetrating the insulator 145 in the thickness direction, the porous Ip2− electrode 133 which surrounds the entire opening at the lower end of the fifth peripheral wall portion 145c, and a portion 129b, of the alumina insulating layer 129, which covers a part of the opening at the upper end of the fifth peripheral wall portion 145c.

The fifth peripheral wall portion 145c is composed of a part of the insulator 145, and has a frame shape which surrounds the inner space S22 in a plan view. The fifth peripheral wall portion 145c is larger than each peripheral wall portion forming the introduction chamber 161, in a plan view. That is, the inner opening area (cross-sectional area) of the fifth peripheral wall portion 145c is larger than the opening area (cross-sectional area) of the introduction chamber 161. When the opening at the upper end of such a fifth peripheral wall portion 145c of the housing chamber 162 and the opening at the lower end of the fourth peripheral wall portion 129a of the introduction chamber 161 are connected to each other, a part of the opening at the upper end of the fifth peripheral wall portion 145c protrudes outward with respect to the introduction chamber 161 (fourth peripheral wall portion 129a) in a plan view. Therefore, the portion 129b of the alumina insulating layer 129 is disposed so as to cover the part of the opening at the upper end of the fifth peripheral wall portion 145c which protrudes outward as described above.

The fifth peripheral wall portion 145c is obtained by printing and forming the insulator 145 in a region other than the region that is to be the housing chamber 162, printing carbon in the region that is to be the housing chamber 162, and firing the printed layers thus obtained.

The Ip2− electrode (cathode electrode) 133 is formed on the front surface of the solid electrolyte body 131e so as to cover the entire opening at the lower end of the fifth peripheral wall portion 145c. The solid electrolyte body 131e forms a part of the element body portion 100. The Ip2− electrode 133 is composed of a fired printed layer, and is composed of a flat porous electrode having a predetermined thickness (film thickness). The film thickness of the Ip2− electrode 133 is preferably not less than 15.0 μm and more preferably not less than 20.0 μm, and is preferably not greater than 55.0 μm and more preferably not greater than 40.0 μm. When the film thickness of the Ip2− electrode 133 is within such a range, the condition (A) and the condition (B) described later are easily satisfied.

Similar to the Ip2− electrode (cathode electrode) 133, the Ip2+ electrode (anode electrode) 132 is disposed on the front surface of the solid electrolyte body 131e. The Ip2+ electrode (anode electrode) 132 receives oxygen ions that are generated at the Ip2− electrode (cathode electrode) 133 in accordance with decomposition of NO and move in the solid electrolyte body 131e.

The gas sensor element 10 of the present embodiment is configured such that a volume V1 of the second measurement chamber 160 and a volume V2 of the Ip2− electrode 133 satisfy either one of the condition (A) and the condition (B) described below. The technical basis for deriving the condition (A) and the condition (B) will be described below.

Condition (A): the volume V1 is not less than 0.047 mm$^3$ and not greater than 0.065 mm$^3$ and the volume V2 is not less than 0.030 mm$^3$ and not greater than 0.059 mm$^3$.

Condition (B): the volume V1 is not less than 0.047 mm$^3$ and not greater than 0.125 mm$^3$ and the volume V2 is not less than 0.044 mm$^3$ and not greater than 0.059 mm$^3$.

The volume V1 of the second measurement chamber 160 is the sum of the volume of the introduction chamber 161 and the volume of the housing chamber 162. The volume V1 of the second measurement chamber 160 is equal to the size of the inner space S2 of the second measurement chamber 160, the volume of the introduction chamber 161 is equal to the size of the inner space S21, and the volume of the housing chamber 162 is equal to the size of the inner space S22. In the present embodiment, the introduction chamber 161 has a cylindrical shape, and the volume thereof is obtained as the volume of a column from the inner diameter (diameter) R of the introduction chamber 161 and the length in the up-down direction (height) L1 of the introduction chamber 161.

The volume V2 of the Ip2− electrode 133 is the volume of a portion, of the Ip2− electrode 133, which is housed in the housing chamber 162 of the second measurement chamber 160. In the present embodiment, in a plan view of the Ip2− electrode 133 in the lamination direction of the gas sensor element 10, the area of the Ip2− electrode 133 is larger than the area of the opening (opening area) of the fifth peripheral wall portion 145c of the housing chamber 162. Therefore, in the present embodiment, the volume V2 of the Ip2− electrode 133 is obtained by multiplying the opening area of the fifth peripheral wall portion 145c of the housing chamber 162 by the thickness (film thickness) of the Ip2− electrode 133. In another embodiment, when the area of the Ip2– electrode 133 is smaller than the opening area of the fifth peripheral wall portion 145$c$ of the housing chamber 162, the volume V2 of the Ip2– electrode 133 is obtained by multiplying the area of the Ip2– electrode 133 by the thickness (film thickness) of the Ip2– electrode 133.

In order to configure the gas sensor element 10 of the present embodiment such that the volume V1 of the second measurement chamber 160 and the volume V2 of the Ip2– electrode 133 satisfy either one of the condition (A) and the condition (B) described above, the size (cross-sectional area, etc.) of the second measurement chamber 160 and the size (thickness, etc.) of the Ip2– electrode 133 need to be set in consideration of the fact that members (laminate of ceramic green sheets, etc.) for producing the gas sensor element 10 shrink due to firing during production of the gas sensor element 10.

In the gas sensor element 10, when the relationship between the volume V1 of the second measurement chamber 160 and the volume V2 of the Ip2– electrode 133 satisfies either one of the condition (A) and the condition (B), the responsiveness (responsiveness to NO) of the Ip2 cell 130 for detecting an $NO_x$ concentration is improved.

Specifically, in the case where exhaust gas (gas to be measured) containing NO is caused to flow through an exhaust passage in an exhaust pipe at a gas flow velocity of 12 m/sec, in a state where the gas sensor 1 including the gas sensor element 10 is mounted at a predetermined location in the exhaust pipe, when NO in the exhaust gas introduced into the second measurement chamber 160 of the gas sensor element 10 is decomposed into nitrogen and oxygen at the Ip2– electrode 133 included in the Ip2 cell 130, the time (rise time of an output waveform) for which the output of the second pump current (current Ip2) flowing through the Ip2 cell 130 reaches 90% from 10% is within 1 second.

Figure 6:
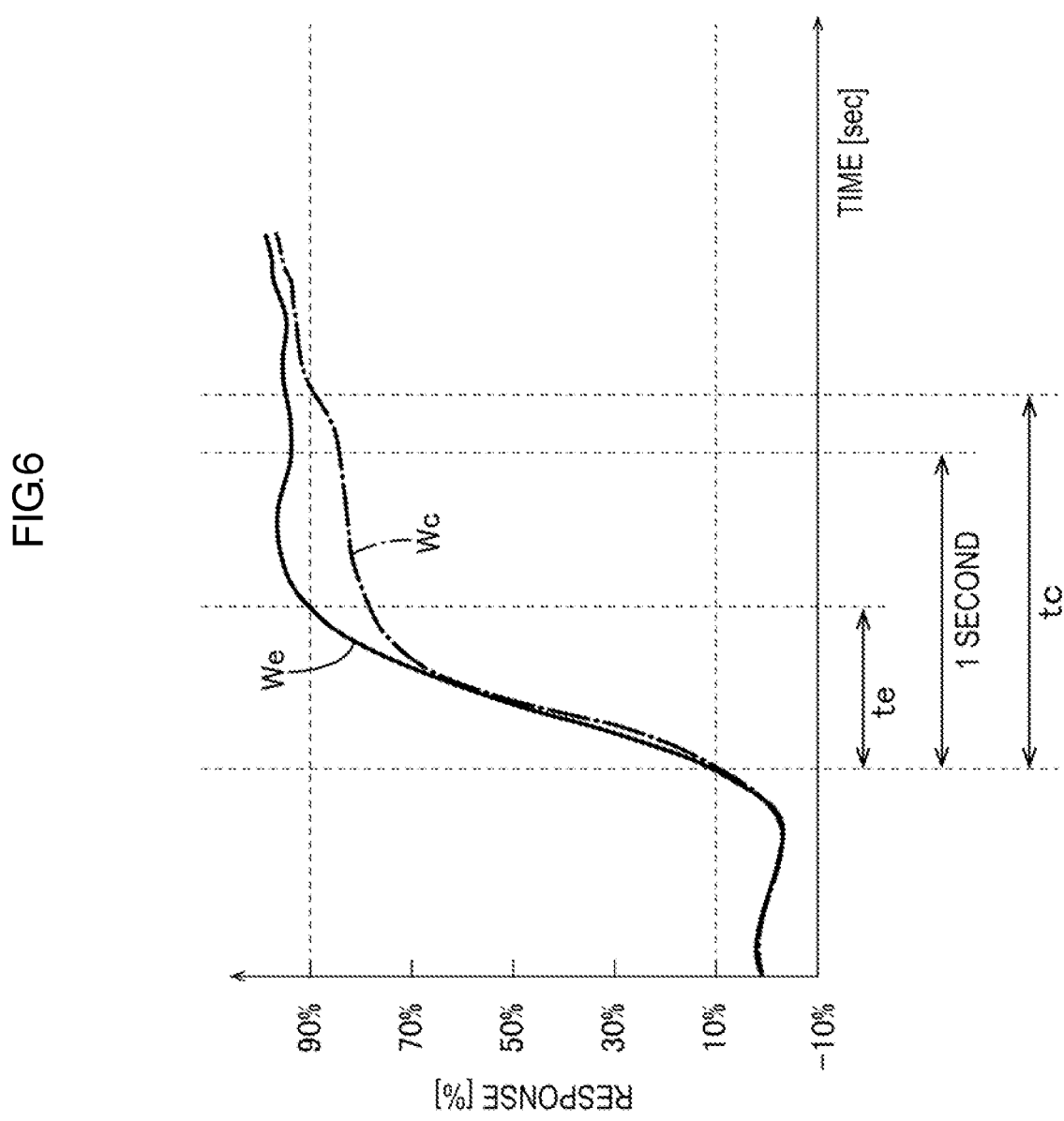
FIG. 6 is a graph showing the output waveform of a second pump current flowing through an Ip2 cell of the gas sensor element.

FIG. 6 is a graph showing the output waveform of a second pump current flowing through the Ip2 cell 130 of the gas sensor element 10. The horizontal axis of the graph shown in FIG. 6 indicates time (sec), and the response (%) shown on the vertical axis of the graph represents a ratio (%) of the output of the second pump current. Here, the current value at the top in the output waveform of the second pump current is set to 100%. In FIG. 6, an output waveform We of the second pump current in the gas sensor 1 (gas sensor element 10) of the present embodiment is shown by a solid line. A time te for which the output of the second pump current of the gas sensor 1 reaches 90% from 10% is within 1 second. In FIG. 6, as a comparative example, an output waveform We of the second pump current in a gas sensor that satisfies neither the condition (A) nor the condition (B) is shown by an alternate long and short dashed line. In the comparative example, a time tc for which the output of the second pump current reaches 90% from 10% exceeds 1 second.

Tests

Next, the contents of tests from which the condition (A) and the condition (B) are derived will be described.

Examples 1 to 5

As each of Examples 1 to 5, five gas sensors having the same basic configuration as the gas sensor (gas sensor element) of Embodiment 1 described above were produced. The inner diameter [mm] of the introduction chamber of the second measurement chamber in the gas sensor of each Example was set to a value shown in Table 1. For reference, Table 1 also shows the inner diameter [mm] of the introduction chamber of the second measurement chamber in the gas sensor element before firing. In the gas sensor of each Example, the magnitude of the inner diameter [mm] of the introduction chamber is set in consideration of shrinkage after firing. In addition, the film thickness [mm] of the Ip2– electrode in the gas sensor of each Example was set to a value shown in Table 1. The area [mm$^2$] of the Ip2– electrode is determined by the opening area of the housing chamber. For reference, the opening area of the housing chamber before firing was 2.13 mm$^2$.

In each Example, the height (length in the up-down direction) L1 of the introduction chamber was 0.232 mm, and a height (length in the up-down direction) L2 of the housing chamber was 0.024 mm.

The values of the inner diameter of the introduction chamber, the height L1 of the introduction chamber, the height L2 of the housing chamber, the film thickness of the Ip2– electrode, the area of the Ip2– electrode, etc., in the gas sensor after firing are obtained by analyzing SEM images of each cut surface obtained by cutting the gas sensor element in the longitudinal direction (axial line AX direction) and the width direction after carrying out a responsiveness evaluation described below. Each value is the average of the five samples.

Comparative Examples 1 TO 7

Five gas sensors of each of Comparative Examples 1 to 7 were produced in the same manner as Example 1, etc., except that the inner diameter [mm] of the introduction chamber of the second measurement chamber, the film thickness [μm] of the Ip2– electrode, etc., in the gas sensor were set to values shown in Table 1.

(Responsiveness)

The gas sensors produced in each Example and each Comparative Example were evaluated for responsiveness by the following method. In a state where exhaust gas in which the concentration of NO was gradually increased from 0 ppm to 100 ppm was caused to flow through an exhaust passage in an exhaust pipe at a gas flow velocity of 12 m/sec, a gas sensor was mounted at a predetermined location in the exhaust pipe. Then, the time (rise time of an output waveform) for which the output of a second pump current (current Ip2) flowing through the Ip2 cell reached 90% from 10% was obtained for the gas sensor. Such a rise time was obtained 5 times for each of the Examples and the Comparative Examples. Then, the responsiveness of the gas sensors of each Example and each Comparative Example was evaluated according to the evaluation criteria described below. The results are shown in Table 1.

<Evaluation Criteria>

The case where the rise time is within 1 second for all five times: "A"

The case where the rise time exceeds 1 second in at least one test: "B"

The case where the rise time exceeds 1 second for all five times: "C"

TABLE 1

| | SECOND MEASUREMENT CHAMBER | | | | | | | | | |
| | INTRODUCTION CHAMBER | | | | HOUSING | ENTIRETY | | | | |
| | BEFORE FIRING | AFTER FIRING | | | CHAMBER AFTER | AFTER FIRING | Ip2-ELECTRODE AFTER FIRING | | | |
| | INNER DIAMETER [mm] | INNER DIAMETER [mm] | AREA [mm²] | VOLUME [mm³] | FIRING VOLUME [mm³] | VOLUME V1 [mm³] | FILM THICKNESS [μm] | AREA [mm²] | VOLUME V2 [mm³] | RESPON-SIVENESS (n = 5) |
|---|---|---|---|---|---|---|---|---|---|---|
| COMPARATIVE EXAMPLE 1 | 0.8 | 0.67 | 0.35 | 0.081 | 0.036 | 0.117 | 12.9 | 1.48 | 0.019 | C |
| COMPARATIVE EXAMPLE 2 | 0.8 | 0.67 | 0.35 | 0.081 | 0.036 | 0.117 | 20.9 | 1.48 | 0.031 | C |
| COMPARATIVE EXAMPLE 3 | 0.8 | 0.67 | 0.35 | 0.081 | 0.036 | 0.117 | 26.3 | 1.48 | 0.039 | B |
| COMPARATIVE EXAMPLE 4 | 0.6 | 0.50 | 0.20 | 0.046 | 0.036 | 0.082 | 20.9 | 1.48 | 0.031 | B |
| COMPARATIVE EXAMPLE 5 | 0.6 | 0.50 | 0.20 | 0.046 | 0.036 | 0.082 | 26.3 | 1.48 | 0.039 | B |
| COMPARATIVE EXAMPLE 6 | 0.5 | 0.42 | 0.14 | 0.033 | 0.036 | 0.069 | 20.9 | 1.48 | 0.031 | B |
| COMPARATIVE EXAMPLE 7 | 0.5 | 0.42 | 0.14 | 0.033 | 0.036 | 0.069 | 25.0 | 1.48 | 0.037 | B |
| EXAMPLE 1 | 0.8 | 0.67 | 0.35 | 0.081 | 0.036 | 0.117 | 32.0 | 1.48 | 0.047 | A |
| EXAMPLE 2 | 0.6 | 0.50 | 0.20 | 0.046 | 0.036 | 0.082 | 32.0 | 1.48 | 0.047 | A |
| EXAMPLE 3 | 0.4 | 0.33 | 0.09 | 0.021 | 0.036 | 0.057 | 20.9 | 1.48 | 0.031 | A |
| EXAMPLE 4 | 0.4 | 0.33 | 0.09 | 0.021 | 0.036 | 0.057 | 26.3 | 1.48 | 0.039 | A |
| EXAMPLE 5 | 0.4 | 0.33 | 0.09 | 0.021 | 0.036 | 0.057 | 32.0 | 1.48 | 0.047 | A |

Figure 7:
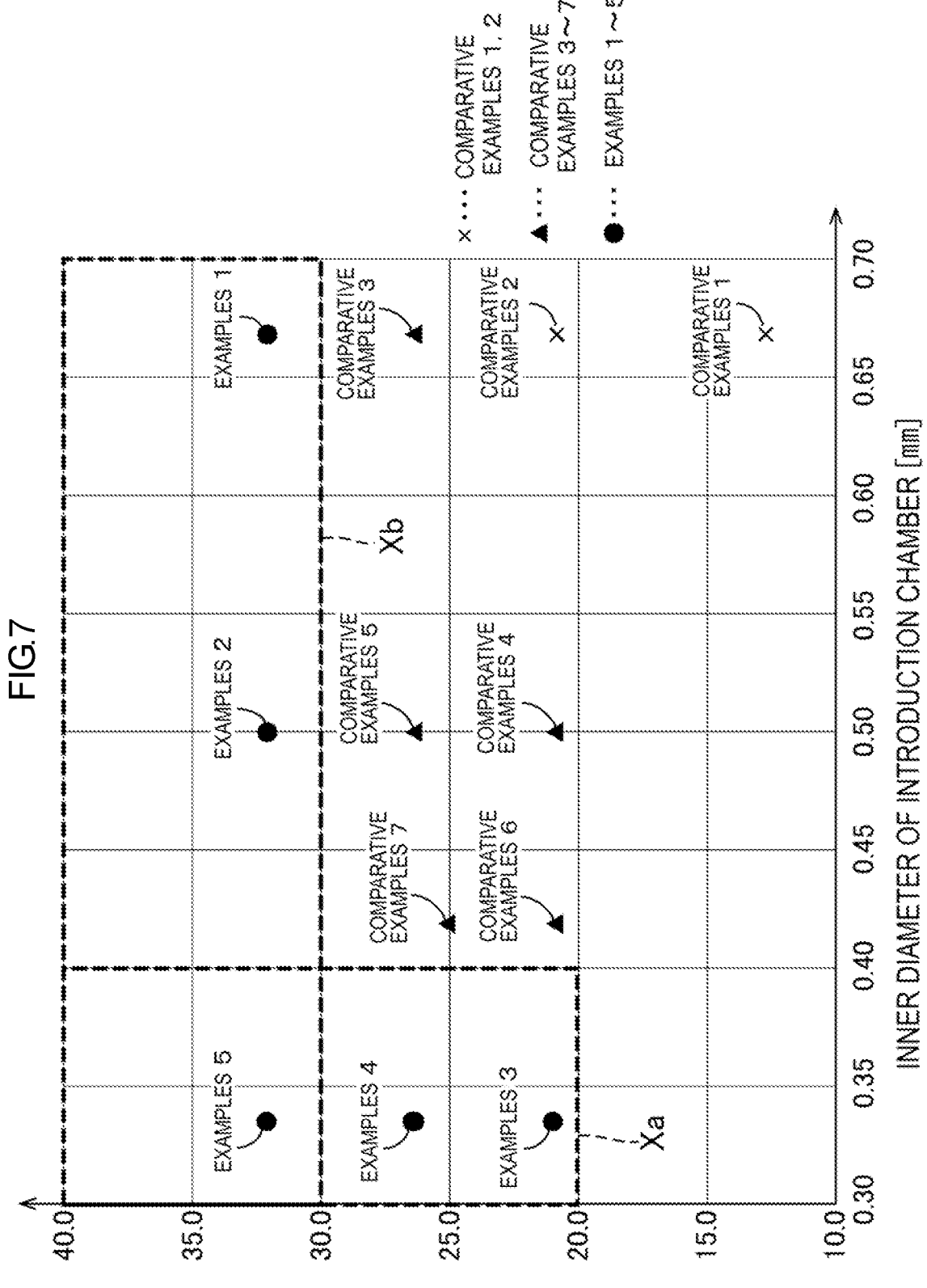
FIG. 7 is a diagram showing the test results of the responsiveness of gas sensors in coordinates.

Here, the test results of Examples 1 to 5 and Comparative Examples 1 to 7 are shown in coordinates of FIG. 7. FIG. 7 is a diagram showing the test results of the responsiveness of the gas sensors in coordinates. The vertical axis of the coordinates shown in FIG. 7 represents the film thickness [μm] of the Ip2− electrode, and the horizontal axis thereof represents the inner diameter [mm] of the introduction chamber. When the results of Examples 1 to 5 and Comparative Examples 1 to 7 are plotted on such coordinates, a state shown in FIG. 7 is obtained.

In such coordinates, a range Xa for a preferable combination of the inner diameter [mm] of the introduction chamber and the film thickness [μm] of the Ip2− electrode is derived from the results of Examples 3 to 5 and Comparative Examples 1 to 7. As for the range Xa, the range of the inner diameter [mm] of the introduction chamber is not less than 0.30 mm and not greater than 0.40 mm, and the range of the film thickness [μm] of the Ip2− electrode is not less than 20.0 m and not greater than 40.0 km.

Moreover, a range Xb for a preferable combination of the inner diameter [mm] of the introduction chamber and the film thickness [μm] of the Ip2− electrode is derived from the results of Examples 1, 2, and 5 and Comparative Examples 1 to 7. As for the range Xb, the range of the inner diameter [mm] of the introduction chamber is not less than 0.030 mm and not greater than 0.70 mm, and the range of the film thickness [μm] of the Ip2− electrode is not less than 30.0 m and not greater than 40.0 km.

The above-described condition (A) is determined on the basis of the range Xa, and the above-described condition (B) is determined on the basis of the range Xb. In Examples 1 to 5 and Comparative Examples 1 to 7, the volumes of the housing chambers of the second measurement chambers can be considered to be substantially the same.

As for the output waveform of the second pump current of the gas sensor (gas sensor element), the smaller the inner diameter (hole diameter) of the introduction chamber of the second measurement chamber, the larger the gradient of rising of the output waveform (see, for example, the output waveform We in FIG. 6). This is inferred because the introduction chamber forms the second measurement chamber together with the housing chamber, and the smaller the inner diameter (hole diameter) of such an introduction chamber, the higher the exchange rate of exhaust gas (containing NO) in the second measurement chamber. From this, the return rate of the exhaust gas is inferred to become higher as the volume V1 of the second measurement chamber is smaller. The lower limit of the inner diameter (hole diameter) of the introduction chamber (lower limit of the volume V1) is set such that a current value of the second pump current is obtained so as to ensure the resolution and accuracy required for the gas sensor. In addition, the upper limit of the inner diameter (hole diameter) of the introduction chamber (upper limit of the volume V1) is set such that the strength of the gas sensor element around the second measurement chamber is ensured.

Moreover, the larger the film thickness (volume V2) of the Ip2− electrode, the larger the number of sites where an NO decomposition reaction takes place, so that the exchange rate of the exhaust gas is inferred to become higher as the film thickness (volume V2) of the Ip2− electrode is larger.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application claims priority from Japanese Patent Application No. 2021-206698 filed Dec. 21, 2021, incorporated herein by reference in its entirety.

What is claimed is:

1. A gas sensor element comprising:

an element body portion which includes a plurality of laminated ceramic sheets;

a pump cell which is configured to adjust a concentration of oxygen in a gas to be measured which is introduced into the element body portion;

a detection chamber which is formed inside the element body portion and into which the gas to be measured in which the concentration of oxygen has been adjusted is introduced; and a layer-shaped cathode electrode which is housed in the detection chamber and configured to decompose NO, wherein a relationship between a volume V1 of the detection chamber and a volume V2 of the cathode electrode satisfies either a condition (A) or a condition (B) described below, Condition (A): the volume V1 is not less than 0.047 $mm^3$ and not greater than 0.057 $mm^3$ and the volume V2 is not less than 0.031 $mm^3$ and not greater than 0.047 $mm^3$, and Condition (B): the volume V1 is not less than 0.057 $mm^3$ and not greater than 0.117 $mm^3$ and the volume V2 is not less than 0.047 $mm^3$ and not greater than 0.059 $mm^3$.

2. The gas sensor element as claimed in claim 1, wherein the detection chamber penetrates at least one ceramic sheet among the plurality of ceramic sheets, in a thickness direction, and in a region where the detection chamber penetrates the at least one ceramic sheet, a cross-sectional area of the detection chamber in a plane direction of the at least one ceramic sheet is not less than 0.05 $mm^2$ and not greater than 0.35 $mm^2$.

3. The gas sensor element as claimed in claim 1, further comprising:

a solid electrolyte layer which forms a part of the element body portion and has a front surface on which the cathode electrode is formed; and an anode electrode which is disposed on the front surface of the solid electrolyte layer and configured to receive oxygen ions that are generated at the cathode electrode in accordance with decomposition of NO and move in the solid electrolyte layer.

4. A gas sensor comprising the gas sensor element as claimed in claim 1.

* * * * *